United States Patent
Tsou et al.

(10) Patent No.: US 12,320,992 B2
(45) Date of Patent: Jun. 3, 2025

(54) FLOATING IMAGE DISPLAY DEVICE

(71) Applicant: INDUSTRIAL TECHNOLOGY RESEARCH INSTITUTE, Hsinchu (TW)

(72) Inventors: Hung Tsou, Zhubei (TW); Chia-Ping Lin, Taipei (TW); Yi-Hsiang Huang, Changhua (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 83 days.

(21) Appl. No.: 18/382,472

(22) Filed: Oct. 20, 2023

(65) Prior Publication Data

US 2025/0067995 A1    Feb. 27, 2025

(30) Foreign Application Priority Data

Aug. 22, 2023   (TW) ................. 112131507

(51) Int. Cl.
*G02B 30/56*    (2020.01)
*G02B 3/00*    (2006.01)
*G02B 5/00*    (2006.01)
*H04N 13/349*    (2018.01)

(52) U.S. Cl.
CPC ............. *G02B 30/56* (2020.01); *G02B 3/005* (2013.01); *G02B 5/003* (2013.01); *H04N 13/349* (2018.05)

(58) Field of Classification Search
CPC ........ G02B 30/56; G02B 3/005; G02B 5/003; H04N 13/349
See application file for complete search history.

(56) References Cited

U.S. PATENT DOCUMENTS

| 10,225,541 | B2 | 3/2019 | Masumura et al. |
| 11,194,402 | B1 * | 12/2021 | Yang ................. G02B 30/26 |
| 11,546,574 | B2 | 1/2023 | Arieli et al. |

(Continued)

FOREIGN PATENT DOCUMENTS

| CN | 103759826 A | 4/2014 |
| CN | 105137605 A | 12/2015 |

(Continued)

OTHER PUBLICATIONS

TW Office Action dated Aug. 21, 2024 in application 112131507.

*Primary Examiner* — Mishawn N. Hunter
(74) *Attorney, Agent, or Firm* — Maschoff Brennan

(57) ABSTRACT

A floating image display device includes a light source module, a periodical optical structure and a blocking layer. The light source module generates light. The periodical optical structure includes lenses, and the light passes through the periodical optical structure and forms a floating image. The blocking layer is configured to block or absorb a part of the light, and the blocking layer is between any adjacent two lenses. A beam angle of another part of the light not blocked or absorbed by the blocking layer ranges between angles $\alpha$ and $\beta$, and the following conditions are satisfied: $\alpha = \tan^{-1}(d/h)$; and $\beta = 2\tan^{-1}(d/2h)$, wherein $\alpha$ is an off-axis viewing angle, $\beta$ is an on-axis viewing angle, d is a maximum width of an aperture corresponding to each lens, and h is a distance from the light source module to the aperture.

12 Claims, 5 Drawing Sheets

(56) References Cited

U.S. PATENT DOCUMENTS

| | | | |
|---|---|---|---|
| 2010/0271290 A1* | 10/2010 | Tomisawa | H04N 13/393 345/32 |
| 2021/0003858 A1 | 1/2021 | Hamano | |
| 2022/0082663 A1 | 3/2022 | Chou et al. | |
| 2022/0311990 A1 | 9/2022 | Makinen et al. | |

FOREIGN PATENT DOCUMENTS

| | | |
|---|---|---|
| CN | 206060924 U | 3/2017 |
| CN | 111522146 A | 8/2020 |
| CN | 113811809 A | 12/2021 |
| CN | 114175627 A | 3/2022 |
| CN | 116381960 A | 7/2023 |
| TW | I614533 B | 2/2018 |
| TW | I654448 B | 3/2019 |
| TW | 202210868 A | 3/2022 |

* cited by examiner

FLOATING IMAGE DISPLAY DEVICE

CROSS-REFERENCE TO RELATED APPLICATIONS

This non-provisional application claims priority under 35 U.S.C. § 119 (a) on Patent Application No(s). 112131507 filed in Taiwan, R.O.C. on Aug. 22, 2023, the entire contents of which are hereby incorporated by reference.

TECHNICAL FIELD

This disclosure relates to a floating image display device.

BACKGROUND

Three-dimensional imaging technology accurately presents the three-dimensional images of objects in real space, creating an authentic three-dimensional visual experience. Conventional three-dimensional imaging techniques encompass 3D projection, volumetric 3D image display, and holographic projection, for example. Among these techniques, 3D projection employs parallel and/or perspective projections to project the three-dimensional image of an object onto a two-dimensional plane. Volumetric 3D image display technology utilizes light sources (e.g., lasers) directed onto rapidly spinning disks to exploit light scattering to display the points of a stereoscopic object in three-dimensional space, creating a comprehensive three-dimensional image. Holographic projection technology is a virtual imaging technique that recreates three-dimensional object images. By recording object information from various angles using principles of light interference and diffraction, the information, in the form of imaging light, is projected onto a transparent film or lens to form a three-dimensional image.

The optical-based floating display technology described above utilizes a floating lens for refracting and bending light, projecting images to precise positions, resulting in the visual experience of floating in mid-air. Nonetheless, when the light passes through the ineffective area of the floating lens, it may lead to stray light. Stray light may compromise the clarity of the floating image, leading to blurring at the periphery of the floating image and thus resulting in a degradation of image quality.

SUMMARY

According to one or more embodiments of this disclosure, a floating image display device includes a light source module, a periodical optical structure and a blocking layer. The light source module is configured to generate a light. The periodical optical structure includes a plurality of lenses arranged adjacent to one another, and the light passes through the periodical optical structure and forms at least one floating image. The blocking layer is configured to block or absorb a part of the light, and the blocking layer is disposed between any two of the plurality of lenses that are adjacently arranged in the periodical optical structure. In addition, a beam angle of another part of the light that is not blocked or absorbed by the blocking layer ranges between angles α and β, and the following conditions are satisfied:

$$\alpha = \tan^{-1}(d/h);$$

and $$\beta = 2\tan^{-1}(d/2h),$$

wherein α is an off-axis viewing angle, β is an on-axis viewing angle, d is a maximum width of an aperture corresponding to each of the plurality of lenses, and h is a distance from the light source module to the aperture.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Aspects and advantages of the invention will become apparent from the following detailed descriptions with the accompanying drawings. For purposes of explanation, one or more embodiments are given to provide a thorough understanding of the invention, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

Figure 1:
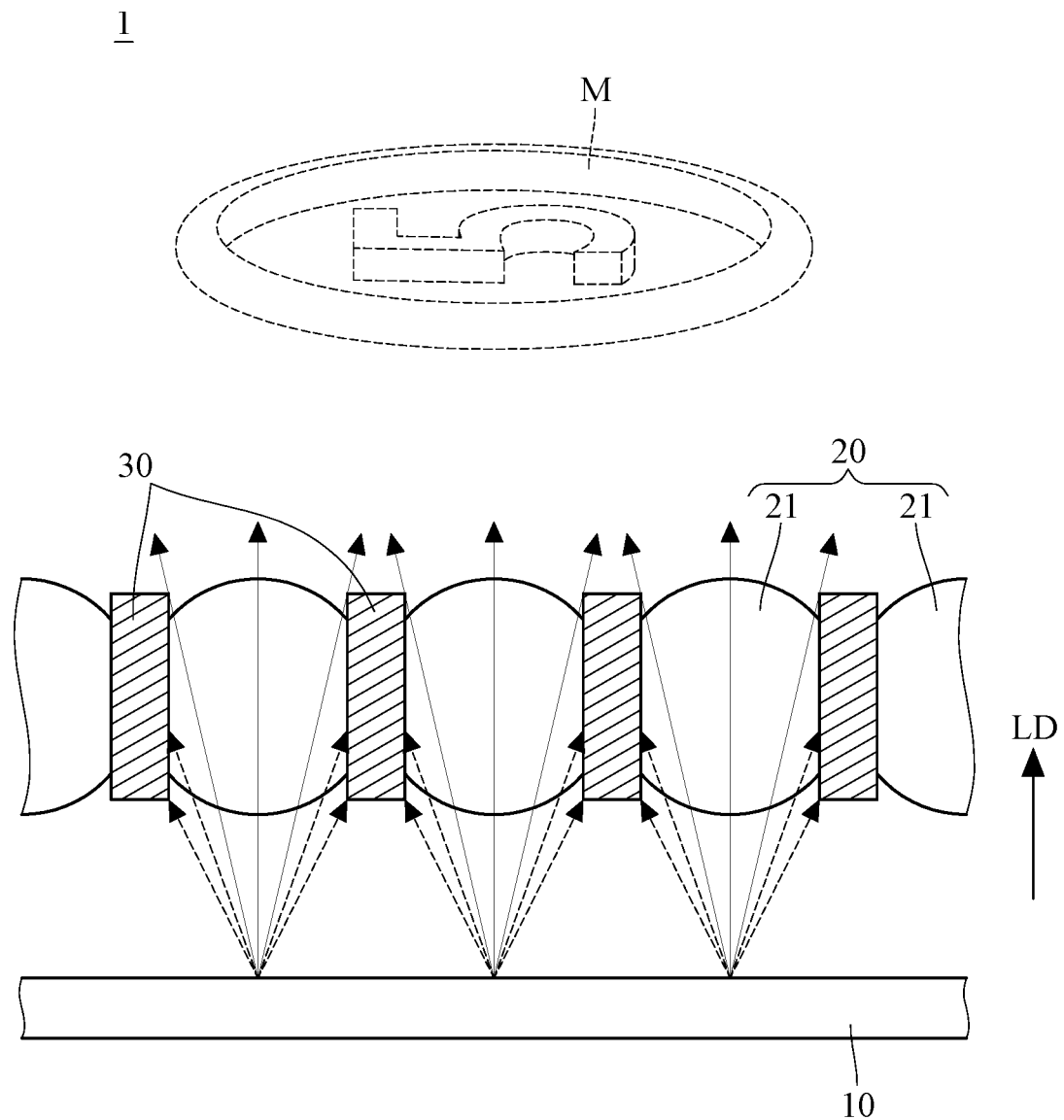
FIG. 1 is a schematic view of a floating image display device in accordance with the first embodiment of the disclosure.
Figure 2:
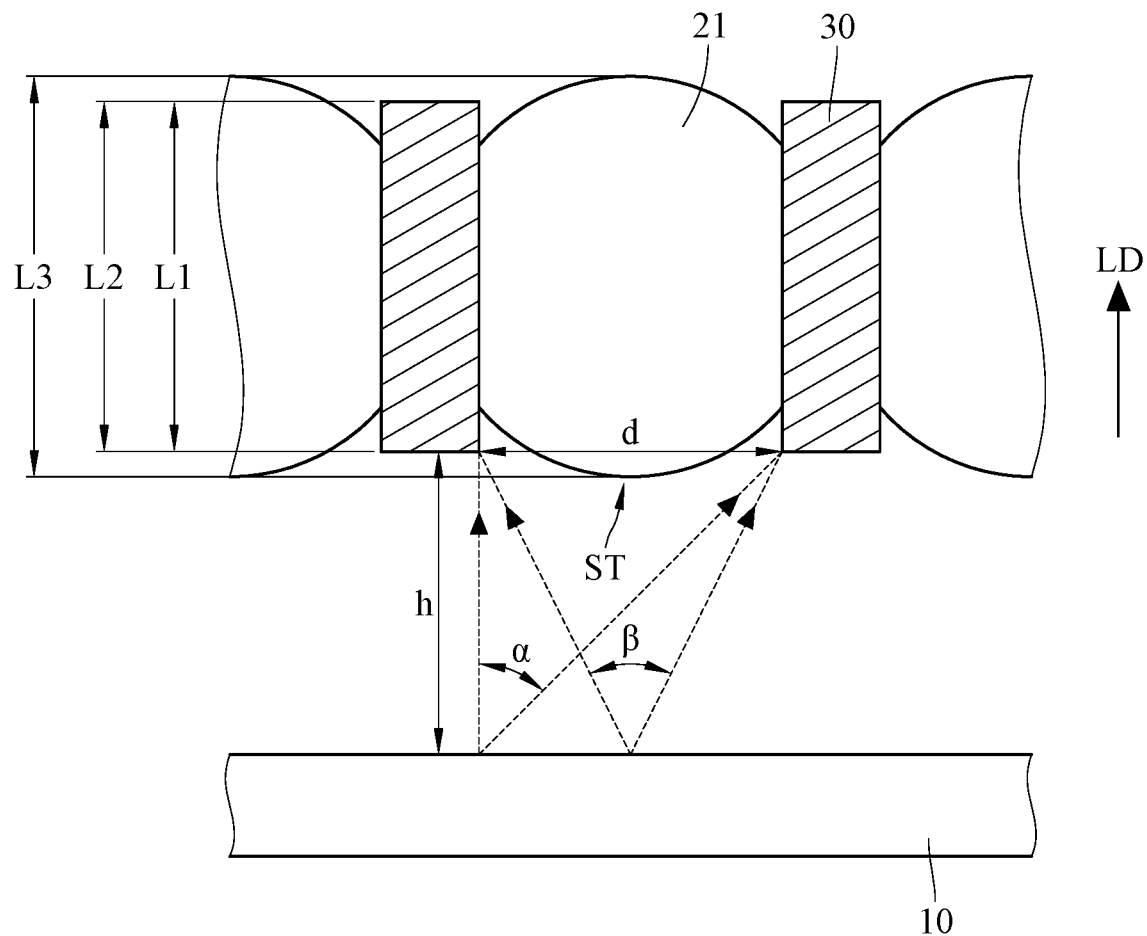
FIG. 2 is a partial schematic view of the floating image display device in FIG. 1.

Referring to FIG. 1 and FIG. 2, FIG. 1 is a schematic view of a floating image display device in accordance with the first embodiment of the disclosure, and FIG. 2 is a partial schematic view of the floating image display device in FIG. 1.

In this embodiment a floating image display device 1 is provided. The floating image display device 1 is, for example, configured to generate a floating image M, and the floating image display device 1 may include a light source module 10, a periodical optical structure 20 and a blocking layer 30.

The light source module 10 is configured to generate light, and the light source module 10 may include light sources such as light emitting diodes (LEDs), quantum dots, organic light emitting diodes (OLEDs), or similar light sources.

The periodical optical structure 20 may include a plurality of lenses 21 arranged adjacent to one another, and the lenses 21 are spaced apart from one another. The light passes through the lenses 21 of the periodical optical structure 20, and is redirected to form at least one floating image M. The lenses 21 may be, for example, spherical lenses, aspheric lenses, freeform lenses or hemispherical lenses, but the present disclosure is not limited thereto.

The blocking layer 30 is configured to block or absorb a part of the light (e.g., unwanted wide-angle light rays, such as the dashed single-arrow light rays shown in FIG. 1 and even larger-angle light rays not depicted in the figure). The blocking layer 30 is disposed between any two of the lenses 21 that are adjacently arranged in the periodical optical structure 20, and the blocking layer 30 at least partially overlaps with the lenses 21 in a direction perpendicular to a light emission direction LD. In this embodiment, the lenses 21 are spaced apart from one another by the blocking layer 30 and thus are not directly connected to one another.

The blocking layer 30 at least partially overlaps with the lenses 21 in the direction perpendicular to the light emission direction LD. Referring to FIG. 2, a ratio of a length L1 of the blocking layer 30 in a direction parallel to the light emission direction LD to a length L2 of an overlapped region between the blocking layer 30 and the lenses 21 in the direction parallel to the light emission direction LD may be 1:1, and a ratio of the length L2 of the overlapped region between the blocking layer 30 and the lenses 21 in the direction parallel to the light emission direction LD to a length L3 of the lenses 21 in the direction parallel to the light emission direction LD may range from 1:1 to 1:2. Said overlapped region between the blocking layer and the lenses refers to the region where the blocking layer and the lenses overlap each other in the direction perpendicular to the light emission direction.

A light transmittance of the blocking layer 30 may be smaller than 30%, and the blocking layer 30 may be made from dark plastic material, dark photoresist, or metal, but the present disclosure is not limited thereto. In this embodiment, a cross-sectional shape of the blocking layer 30 parallel to the light emission direction LD is, for example, rectangular.

A beam angle of another part of the light (e.g., the solid single-arrow light rays shown in FIG. 1) that is not blocked or absorbed by the blocking layer 30 ranges between angles $\alpha$ and $\beta$, and the following conditions are satisfied: $\alpha = \tan^{-1}(d/h)$; and $\beta = 2\tan^{-1}(d/2h)$, wherein $\alpha$ is an off-axis viewing angle, $\beta$ is an on-axis viewing angle, d is a maximum width of an aperture ST corresponding to each lens 21, and h is a distance from the light source module 10 to the aperture ST. For instance, in this embodiment, the maximum width d of the aperture ST corresponding to each lens 21 is 0.2 mm, and the distance h from the light source module 10 to the aperture ST is 0.2 mm. Based on the aforementioned conditions, the off-axis viewing angle $\alpha$ is 45 degrees, and the on-axis viewing angle $\beta$ is 53.13 degrees. Accordingly, the beam angle of the another part of the light that is not blocked or absorbed by the blocking layer 30 ranges between 45 degrees and 53.13 degrees. In this embodiment, the aperture ST is an opening formed by the blocking layer 30 and located adjacent to the light source module 10. Moreover, the aperture ST may be in any shape, such as circular or rectangular, and the present disclosure is not limited thereto.

After conducting simulation calculations, when compared to conventional display devices without a blocking layer, the floating image display device 1 in this embodiment utilizes the blocking layer 30 to absorb or block stray light, which may effectively reduce the intensity of stray light by over 80%, while simultaneously retaining the necessary imaging light rays and effectively eliminating undesired stray light. This approach prevents the gathering of stray light within the imaging area, thus safeguarding display quality. Therefore, anti-interference purposes may be achieved, and the light rays may be purified so as to increase the sharpness and display quality of the floating three-dimensional images. This improvement enables the floating image display device 1 to clearly display more intricate patterns.

According to the floating image display device 1 in this embodiment, in order to prevent the wide-angle light rays (e.g., stray light) from impacting image quality, the blocking layer 30 is provided in a specific region between each of all adjacent lenses 21 in accordance with the aperture size corresponding to each lens 21 and the distance from the light source module 10 to the aperture ST. It ensures that wide-angle light rays (e.g., stray light) beyond a certain angular range can be absorbed or blocked. Said specific region between each of all adjacent lenses 21 may refer to a particular position and/or length. For instance, the blocking layer 30 is required to be disposed in a specific position between each of all adjacent lenses 21, and the blocking layer 30 is required to extend a particular length between each of all adjacent lenses 21.

In this embodiment, the blocking layer 30 and the lenses 21 may be manufactured by methods such as screen printing, etching, injection molding, laser techniques, meshing, photolithography, and other similar processes, but the present disclosure is not limited thereto.

In one configuration, the lenses 21 and the blocking layer 30 may be manufactured by, for example, an injection molding process. As an example, the manufacturing process begins by crafting mold inserts to form injection mold cores. Dual-cavity molds are then produced, and the molds include an injection gate for the blocking layer and another injection gate for the lenses. Subsequently, the blocking layer is injected through its designated injection gate, followed by the lenses through its corresponding injection gate. Finally, the formed blocking layer and lenses are removed from the molds, completing the manufacturing process for both the lenses and the blocking layer.

In this embodiment, the cross-sectional shape of the blocking layer 30 parallel to the light emission direction LD is rectangular, but the present disclosure is not limited thereto. In other embodiments, the cross-sectional shape of the blocking layer parallel to the light emission direction may not necessarily be rectangular and may be modified to be square, trapezoidal, polygonal, or a combination of these shapes.

In this embodiment, the blocking layer 30 and the light source module 10 are arranged spaced apart from each other, such that the blocking layer 30 is not in physical contact with the light source module 10, but the present disclosure is not limited thereto. In other embodiments, the blocking layer may be disposed on the light source module, and the blocking layer is in physical contact with the light source module.

In this embodiment, the lenses 21 of the periodical optical structure 20 are spaced apart from one another, such that the lenses 21 are not in physical contact with one another, but the present disclosure is not limited thereto. In other embodiments, the lenses of the periodical optical structure may be arranged in direct connection with each other, and the adjacent lenses are in physical contact with one another.

In this embodiment, the ratio of the length L1 of the blocking layer 30 in the direction parallel to the light emission direction LD to the length L2 of the overlapped region between the blocking layer 30 and the lenses 21 in the direction parallel to the light emission direction LD may be 1:1, but the present disclosure is not limited thereto. In other embodiments, the ratio of the length of the blocking layer in the direction parallel to the light emission direction to the length of the overlapped region between the blocking layer and the lenses in the direction parallel to the light emission direction may range from 20:1 to 1:1. In some embodiments, the ratio of the length of the blocking layer in the direction parallel to the light emission direction to the length of the overlapped region between the blocking layer and the lenses in the direction parallel to the light emission direction may range from 2:1 to 1:1.

In this embodiment, the ratio of the length L2 of the overlapped region between the blocking layer 30 and the lenses 21 in the direction parallel to the light emission direction LD to the length L3 of the lenses 21 in the direction parallel to the light emission direction LD may range from 1:1 to 1:2, but the present disclosure is not limited thereto. In other embodiments, the ratio of the length of the overlapped region between the blocking layer and the lenses in the direction parallel to the light emission direction to the length of the lenses in the direction parallel to the light emission direction may range from 1:1 to 1:20. In some embodiments, the ratio of the length of the overlapped region between the blocking layer and the lenses in the direction parallel to the light emission direction to the length of the lenses in the direction parallel to the light emission direction may range from 1:1 to 1:2.

In this embodiment, the length L1 of the blocking layer 30 in the direction parallel to the light emission direction LD is smaller than the length L3 of the lenses 21 in the direction parallel to the light emission direction LD, but the present disclosure is not limited thereto. In other embodiments, the length of the blocking layer in the direction parallel to the light emission direction may be larger than the length of the lenses in the direction parallel to the light emission direction.

Figure 3:
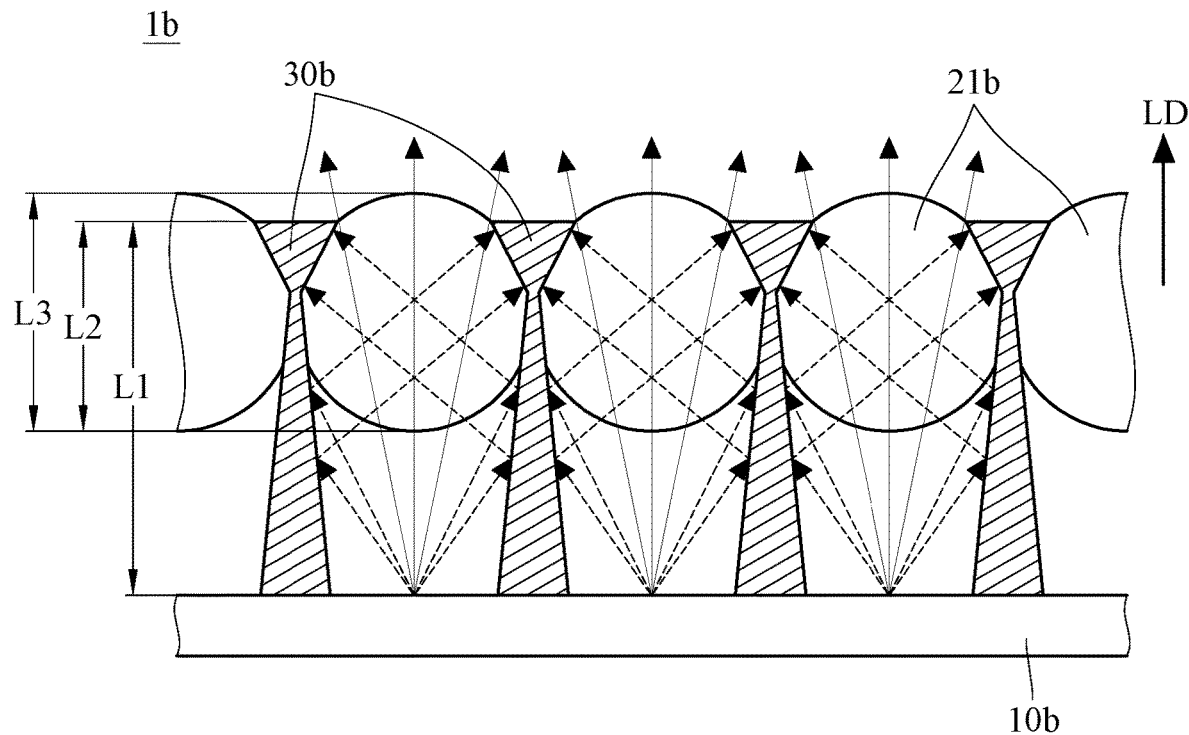
FIG. 3 is a schematic view of a floating image display device in accordance with the second embodiment of the disclosure.

Please refer to FIG. 3, which is a schematic view of a floating image display device in accordance with the second embodiment of the disclosure. In this embodiment (corresponding to FIG. 3), a floating image display device 1b is similar to the floating image display device 1 in FIG. 1 as described above. The same reference numerals indicate the same components, and functions and effects provided by those components are the same as described above, so an explanation in this regard will not be provided again.

In this embodiment, a cross-sectional shape of a blocking layer 30b parallel to a light emission direction LD is in a shape of two combined trapezoids, and a width of the cross section of the blocking layer 30b may first taper and then progressively increase along the light emission direction LD. In addition, a portion of the blocking layer 30b with a trapezoidal shape located closer to a light source module 10b can be considered as a lower blocking layer, a portion of the blocking layer 30b with an inverted trapezoidal shape located farther away from the light source module 10b can be considered as an upper blocking layer, the lower blocking layer can control the beam angle, and the upper blocking layer can absorb reflected light from the lower blocking layer. Moreover, the blocking layer 30b is disposed on the light source module 10b, and the blocking layer 30b is in physical contact with the light source module 10b. Furthermore, a length L1 of the blocking layer 30b in a direction parallel to the light emission direction LD may be larger than a length L3 of a plurality of lenses 21b in the direction parallel to the light emission direction LD.

The blocking layer 30b at least partially overlaps with the lenses 21b in a direction perpendicular to the light emission direction LD. In this embodiment, a ratio of the length L1 of the blocking layer 30b in the direction parallel to the light emission direction LD to a length L2 of an overlapped region between the blocking layer 30b and the lenses 21b in the direction parallel to the light emission direction LD may range from 2:1 to 1:1, and a ratio of the length L2 of the overlapped region between the blocking layer 30b and the lenses 21b in the direction parallel to the light emission direction LD to the length L3 of the lenses 21b in the direction parallel to the light emission direction LD may range from 1:1 to 1:2. Said overlapped region between the blocking layer and the lenses refers to the region where the blocking layer and the lenses overlap each other in the direction perpendicular to the light emission direction.

After conducting simulation calculations, when compared to conventional display devices without a blocking layer, the floating image display device 1b in this embodiment utilizes the blocking layer 30b to absorb or block stray light, which may effectively reduce the intensity of stray light by over 90%, while simultaneously retaining the necessary imaging light rays and effectively eliminating undesired stray light. This approach prevents the gathering of stray light within the imaging area, thus safeguarding display quality. Therefore, anti-interference purposes can be achieved and the light rays can be purified so as to increase the sharpness and display quality of the floating three-dimensional images. This improvement enables the floating image display device 1b to clearly display more intricate patterns.

In this embodiment, the blocking layer 30b and the lenses 21b may be manufactured by methods such as screen printing, etching, injection molding, laser techniques, meshing, photolithography, and other similar processes, but the present disclosure is not limited thereto.

In one configuration, the lenses 21b and the blocking layer 30b may be manufactured by, for example, a printing process. As an example, the manufacturing process begins by fabricating lenses using methods such as photolithography, precision machining and etching, nanoimprinting, or 3D printing. Subsequently, a material with a transmittance of less than 30% is coated between the lenses using a high-precision ink jet printer, and it is solidified to form a blocking layer. Therefore, the utilization of materials with a transmittance of less than 30% enables the blocking or absorption of stray light, thereby improving image quality.

Figure 4:
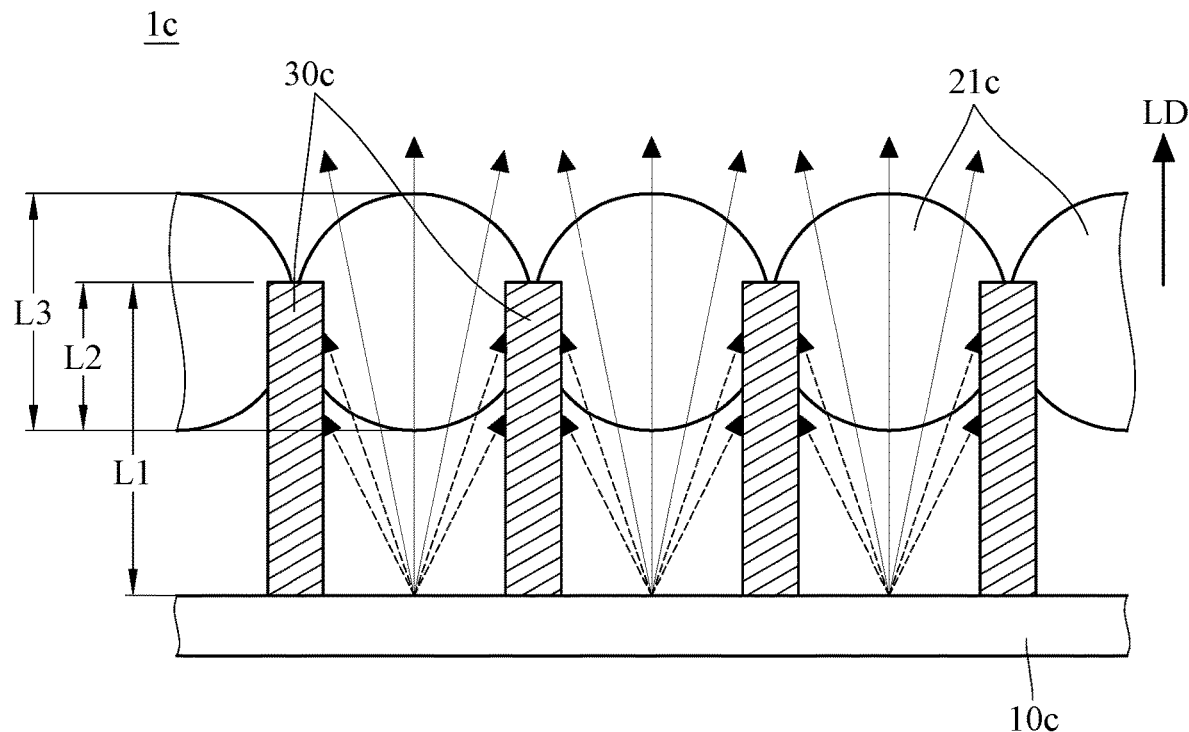
FIG. 4 is a schematic view of a floating image display device in accordance with the third embodiment of the disclosure.

Please refer to FIG. 4, which is a schematic view of a floating image display device in accordance with the third embodiment of the disclosure. In this embodiment (corresponding to FIG. 4), a floating image display device 1c is similar to the floating image display device 1 in FIG. 1 as described above. The same reference numerals indicate the same components, and functions and effects provided by those components are the same as described above, so an explanation in this regard will not be provided again.

In this embodiment, a blocking layer 30c is disposed on a light source module 10c, and the blocking layer 30c is in physical contact with the light source module 10c. Furthermore, a length L1 of the blocking layer 30c in a direction parallel to a light emission direction LD is larger than a length L3 of a plurality of lenses 21c in the direction parallel to the light emission direction LD.

The blocking layer 30c at least partially overlaps with the lenses 21c in a direction perpendicular to the light emission direction LD. In this embodiment, a ratio of the length L1 of the blocking layer 30c in the direction parallel to the light emission direction LD to a length L2 of an overlapped region between the blocking layer 30c and the lenses 21c in the direction parallel to the light emission direction LD may range from 3:1 to 1:1, and a ratio of the length L2 of the overlapped region between the blocking layer 30c and the lenses 21c in the direction parallel to the light emission direction LD to the length L3 of the lenses 21c in the direction parallel to the light emission direction LD may range from 1:1 to 1:2. Said overlapped region between the blocking layer and the lenses refers to the region where the blocking layer and the lenses overlap each other in the direction perpendicular to the light emission direction.

After conducting simulation calculations, when compared to conventional display devices without a blocking layer, the floating image display device 1c in this embodiment utilizes the blocking layer 30c to absorb or block stray light, which may effectively reduce the intensity of stray light by over 80%, while simultaneously retaining the necessary imaging light rays and effectively eliminating undesired stray light. This approach prevents the gathering of stray light within the imaging area, thus safeguarding display quality. Therefore, anti-interference purposes can be achieved and the light rays can be purified so as to increase the sharpness and display quality of the floating three-dimensional images. This improvement enables the floating image display device 1c to clearly display more intricate patterns.

In this embodiment, the blocking layer 30c and the lenses 21c may be manufactured by methods such as screen printing, etching, injection molding, laser techniques, meshing, photolithography, and other similar processes, but the present disclosure is not limited thereto.

In one configuration, the lenses 21c and the blocking layer 30c may be manufactured by, for example, a photolithography process. As an example, firstly, a low-transmission material for the formation of the blocking layer is applied onto the light source module. Subsequently, a substrate or photomask with desired pattern or structure is used to shield portions of the low-transmission material, followed by exposure to light sources in the exposure area of the low-transmission material. Afterward, the low-transmission material undergoes development treatment, leaving the required pattern or structure of the low-transmission material, thereby forming the blocking layer. Then, the lens material is applied onto the blocking layer, the light source module, and within the blocking layer. Subsequently, a substrate or photomask with desired pattern or structure is used to shield portions of the lens material, followed by exposure to light sources in the exposure area of the lens material. Afterward, the lens material undergoes development treatment, retaining the required pattern or structure of the lens material, thereby forming the lenses within the blocking layer.

Figure 5:
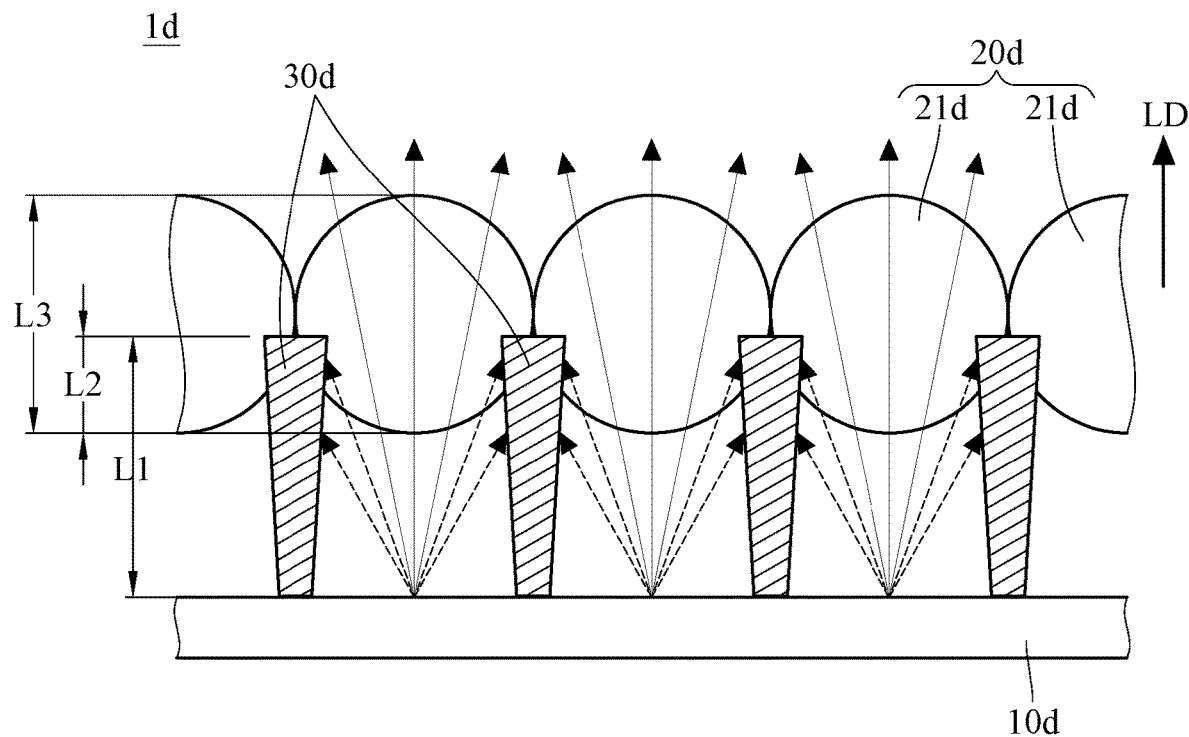
FIG. 5 is a schematic view of a floating image display device in accordance with the fourth embodiment of the disclosure.

Please refer to FIG. 5, which is a schematic view of a floating image display device in accordance with the fourth embodiment of the disclosure. In this embodiment (corresponding to FIG. 5), a floating image display device 1d is similar to the floating image display device 1 in FIG. 1 as described above. The same reference numerals indicate the same components, and functions and effects provided by those components are the same as described above, so an explanation in this regard will not be provided again.

In this embodiment, a cross-sectional shape of a blocking layer 30d parallel to a light emission direction LD is inverted trapezoidal, and a width of the cross section may progressively increase along the light emission direction LD so as to control the angle variation of the blocking layer 30d, thereby restricting the angle of light emission, achieving the filtering out of stray light, and consequently enhancing the sharpness of the floating image. In addition, the blocking layer 30d may be disposed on a light source module 10d, and the blocking layer 30d is in physical contact with the light source module 10d. In addition, a plurality of lenses 21d of a periodical optical structure 20d are arranged in direct connection with each other, and at least part of the lenses 21d that are adjacently arranged may be in physical contact with each other. Furthermore, a length L1 of the blocking layer 30d in a direction parallel to the light emission direction LD may be larger than a length L3 of the lenses 21d in the direction parallel to the light emission direction LD.

The blocking layer 30d at least partially overlaps with the lenses 21d in a direction perpendicular to the light emission direction LD. In this embodiment, a ratio of the length L1 of the blocking layer 30d in the direction parallel to the light emission direction LD to a length L2 of an overlapped region between the blocking layer 30d and the lenses 21d in the direction parallel to the light emission direction LD may range from 3:1 to 1:1, and a ratio of the length L2 of the overlapped region between the blocking layer 30d and the lenses 21d in the direction parallel to the light emission direction LD to the length L3 of the lenses 21d in the direction parallel to the light emission direction LD may range from 1:1 to 1:3. Said overlapped region between the blocking layer and the lenses refers to the region where the blocking layer and the lenses overlap each other in the direction perpendicular to the light emission direction.

After conducting simulation calculations, when compared to conventional display devices without a blocking layer, the floating image display device 1d in this embodiment utilizes the blocking layer 30d to absorb or block stray light, which may effectively reduce the intensity of stray light by over 80%, while simultaneously retaining the necessary imaging light rays and effectively eliminating undesired stray light. This approach prevents the gathering of stray light within the imaging area, thus safeguarding display quality. Therefore, anti-interference purposes can be achieved and the light rays can be purified so as to increase the sharpness and display quality of the floating three-dimensional images. This improvement enables the floating image display device 1d to clearly display more intricate patterns.

In this embodiment, the blocking layer 30d and the lenses 21d may be manufactured by methods such as screen printing, etching, injection molding, laser techniques, meshing, photolithography, and other similar processes, but the present disclosure is not limited thereto.

In one configuration, the lenses 21d and the blocking layer 30d may be manufactured by, for example, a photolithography process. For illustrative example, please refer to the corresponding description provided in the third embodiment.

Figure 6:
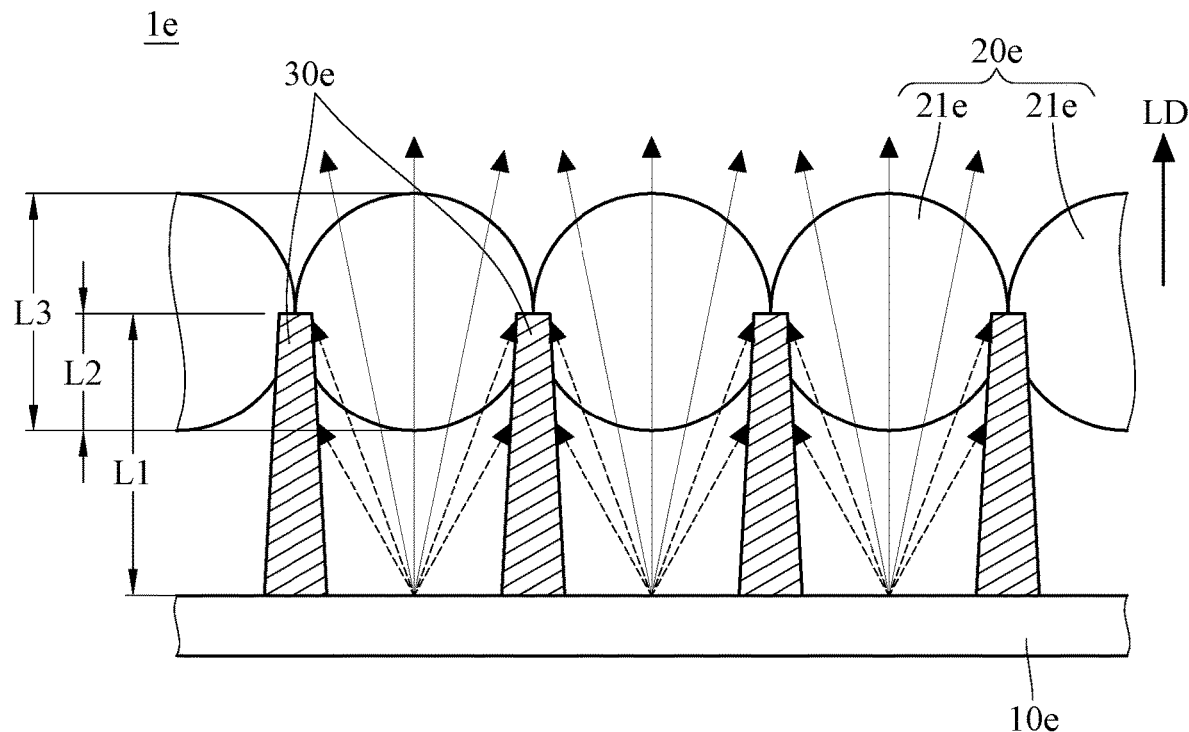
FIG. 6 is a schematic view of a floating image display device in accordance with the fifth embodiment of the disclosure.

Please refer to FIG. 6, which is a schematic view of a floating image display device in accordance with the fifth embodiment of the disclosure. In this embodiment (corresponding to FIG. 6), a floating image display device 1e is similar to the floating image display device 1 in FIG. 1 as described above. The same reference numerals indicate the same components, and functions and effects provided by those components are the same as described above, so an explanation in this regard will not be provided again.

In this embodiment, a cross-sectional shape of a blocking layer 30e parallel to a light emission direction LD is trapezoidal, and a width of the cross section may progressively taper along the light emission direction LD, so that the angle variation of the trapezoidal blocking layer 30e can be utilized to control the angle of light emission, achieving the control of the beam angle and eliminating stray light, and consequently enhancing the sharpness of the floating image. In addition, the blocking layer 30e is disposed on a light source module 10e, and the blocking layer 30e is in physical contact with the light source module 10e. In addition, a plurality of lenses 21e of a periodical optical structure 20e are arranged in direct connection with each other, and at least part of the lenses 21e that are adjacently arranged may be in physical contact with each other. Furthermore, a length L1 of the blocking layer 30e in a direction parallel to the light emission direction LD is larger than a length L3 of the lenses 21e in the direction parallel to the light emission direction LD.

The blocking layer 30e at least partially overlaps with the lenses 21e in a direction perpendicular to the light emission direction LD. In this embodiment, a ratio of the length L1 of the blocking layer 30e in the direction parallel to the light emission direction LD to a length L2 of an overlapped region between the blocking layer 30e and the lenses 21e in the direction parallel to the light emission direction LD may range from 3:1 to 1:1, and a ratio of the length L2 of the overlapped region between the blocking layer 30e and the lenses 21e in the direction parallel to the light emission direction LD to the length L3 of the lenses 21e in the direction parallel to the light emission direction LD may range from 1:1 to 1:3. Said overlapped region between the blocking layer and the lenses refers to the region where the blocking layer and the lenses overlap each other in the direction perpendicular to the light emission direction.

After conducting simulation calculations, when compared to conventional display devices without a blocking layer, the floating image display device 1e in this embodiment utilizes the blocking layer 30e to absorb or block stray light, which may effectively reduce the intensity of stray light by over 80%, while simultaneously retaining the necessary imaging light rays and effectively eliminating undesired stray light. This approach prevents the gathering of stray light within the imaging area, thus safeguarding display quality. Therefore, anti-interference purposes can be achieved and the light rays can be purified so as to increase the sharpness and display quality of the floating three-dimensional images. This improvement enables the floating image display device 1e to clearly display more intricate patterns.

In this embodiment, the blocking layer 30e and the lenses 21e may be manufactured by methods such as screen printing, etching, injection molding, laser techniques, meshing, photolithography, and other similar processes, but the present disclosure is not limited thereto.

In one configuration, the lenses 21e and the blocking layer 30e may be manufactured by, for example, a photolithography process. For illustrative example, please refer to the corresponding description provided in the third embodiment.

Figure 7:
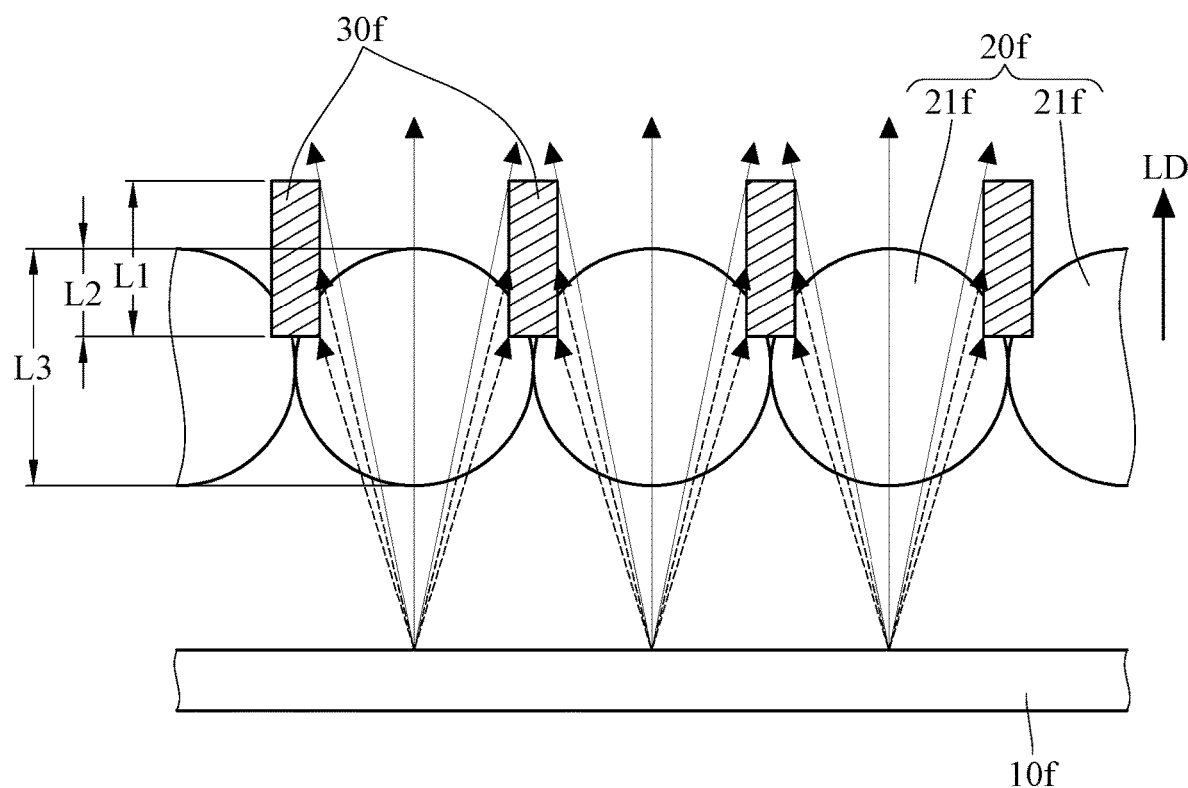
FIG. 7 is a schematic view of a floating image display device in accordance with the sixth embodiment of the disclosure.

Please refer to FIG. 7, which is a schematic view of a floating image display device in accordance with the sixth embodiment of the disclosure. In this embodiment (corresponding to FIG. 7), a floating image display device 1f is similar to the floating image display device 1 in FIG. 1 as described above. The same reference numerals indicate the same components, and functions and effects provided by those components are the same as described above, so an explanation in this regard will not be provided again.

In this embodiment, a blocking layer 30f extends from positions between adjacent two of a plurality of lenses 21f in a direction away from a light source module 10f and extends beyond a periodical optical structure 20f.

The blocking layer 30f at least partially overlaps with the lenses 21f in a direction perpendicular to the light emission direction LD. In this embodiment, a ratio of a length L1 of the blocking layer 30f in a direction parallel to the light emission direction LD to a length L2 of an overlapped region between the blocking layer 30f and the lenses 21f in the direction parallel to the light emission direction LD may range from 2:1 to 1:1, and a ratio of the length L2 of the overlapped region between the blocking layer 30f and the lenses 21f in the direction parallel to the light emission direction LD to the length L3 of the lenses 21f in the direction parallel to the light emission direction LD may range from 1:1 to 1:3. Said overlapped region between the blocking layer and the lenses refers to the region where the blocking layer and the lenses overlap each other in the direction perpendicular to the light emission direction.

After conducting simulation calculations, when compared to conventional display devices without a blocking layer, the floating image display device 1f in this embodiment utilizes the blocking layer 30f to absorb or block stray light, which may effectively reduce the intensity of stray light by over 90%, while simultaneously retaining the necessary imaging light rays and effectively eliminating undesired stray light. This approach prevents the gathering of stray light within the imaging area, thus safeguarding display quality. Therefore, anti-interference purposes can be achieved and the light rays can be purified so as to increase the sharpness and display quality of the floating three-dimensional images. This improvement enables the floating image display device 1f to clearly display more intricate patterns.

In this embodiment, the blocking layer 30f and the lenses 21f may be manufactured by methods such as screen printing, etching, injection molding, laser techniques, meshing, photolithography, and other similar processes, but the present disclosure is not limited thereto.

In one configuration, the lenses 21f and the blocking layer 30f may be manufactured by, for example, laser etching and photolithography processes employing mask alignment technique. As an example, firstly, using mask alignment for laser drilling on low-transmission materials for the formation of the blocking layer. Subsequently, lenses are fabricated by methods such as photolithography, precision machining and etching, nanoimprinting, or 3D printing. Finally, the blocking layer and the lenses are attached to each other by alignment bonding techniques.

In view of the above description, the blocking layer is disposed between any two of the lenses that are adjacently arranged in the periodical optical structure, and the floating image display device utilizes the blocking layer to absorb or block stray light, which eliminates undesired stray light while retains necessary imaging light rays. This approach prevents the gathering of stray light within the imaging area, thus safeguarding display quality. Therefore, anti-interference purposes can be achieved and the intensity of stray light can be reduced so as to purify the light rays, thereby increasing the sharpness and display quality of the floating three-dimensional images.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A floating image display device comprising:
  a light source module configured to generate a light;
  a periodical optical structure comprising a plurality of lenses arranged adjacent to one another, and the light passing through the periodical optical structure and forming at least one floating image; and
  a blocking layer configured to block or absorb a part of the light, and the blocking layer disposed between any two of the plurality of lenses that are adjacently arranged in the periodical optical structure;

wherein a beam angle of another part of the light that is not blocked or absorbed by the blocking layer ranges between angles α and β, and the following conditions are satisfied:

$$\alpha = \tan^{-1}(d/h);\text{ and}$$

$$\beta = 2\tan^{-1}(d/2h),$$

wherein α is an off-axis viewing angle, β is an on-axis viewing angle, d is a maximum width of an aperture corresponding to each of the plurality of lenses, and h is a distance from the light source module to the aperture.

2. The floating image display device according to claim 1, wherein a light transmittance of the blocking layer is smaller than 30%.

3. The floating image display device according to claim 2, wherein a cross-sectional shape of the blocking layer parallel to a light emission direction comprises rectangular, square, trapezoidal, polygonal or a combination thereof.

4. The floating image display device according to claim 1, wherein the plurality of lenses comprise spherical lenses, aspheric lenses, freeform lenses or hemispherical lenses.

5. The floating image display device according to claim 1, wherein the blocking layer at least partially overlaps with the plurality of lenses in a direction perpendicular to a light emission direction.

6. The floating image display device according to claim 5, wherein a ratio of a length of an overlapped region between the blocking layer and the plurality of lenses in a direction parallel to the light emission direction to a length of the plurality of lenses in the direction parallel to the light emission direction ranges from 1:1 to 1:20.

7. The floating image display device according to claim 6, wherein the ratio of the length of the overlapped region between the blocking layer and the plurality of lenses in the direction parallel to the light emission direction to the length of the plurality of lenses in the direction parallel to the light emission direction ranges from 1:1 to 1:2.

8. The floating image display device according to claim 5, wherein a ratio of a length of the blocking layer in a direction parallel to the light emission direction to a length of an overlapped region between the blocking layer and the plurality of lenses in the direction parallel to the light emission direction ranges from 20:1 to 1:1.

9. The floating image display device according to claim 8, wherein the ratio of the length of the blocking layer in the direction parallel to the light emission direction to the length of the overlapped region between the blocking layer and the plurality of lenses in the direction parallel to the light emission direction ranges from 2:1 to 1:1.

10. The floating image display device according to claim 1, wherein the plurality of lenses are spaced apart from one another, or the plurality of lenses are arranged in connection with each other.

11. The floating image display device according to claim 1, wherein a length of the blocking layer in a direction parallel to a light emission direction is larger than a length of the plurality of lenses in the direction parallel to the light emission direction.

12. The floating image display device according to claim 1, wherein the blocking layer is disposed on the light source module.

* * * * *